(12) United States Patent
Na et al.

(10) Patent No.: US 8,561,186 B2
(45) Date of Patent: Oct. 15, 2013

(54) DETECTION CIRCUIT, DETECTION METHOD THEREOF, AND MEMORY SYSTEM INCLUDING THE DETECTION CIRCUIT

(75) Inventors: Ji Myung Na, Suwon-si (KR); Jung Hyun Kim, Seoul (KR); Seong Il Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/239,687

(22) Filed: Sep. 22, 2011

(65) Prior Publication Data
US 2012/0117645 A1   May 10, 2012

(30) Foreign Application Priority Data
Nov. 5, 2010   (KR) .................. 10-2010-0109676

(51) Int. Cl.
G06F 11/00   (2006.01)
G06F 7/58   (2006.01)

(52) U.S. Cl.
USPC .......................................... 726/22; 708/255

(58) Field of Classification Search
USPC .......................................... 726/22; 708/255
See application file for complete search history.

(56) References Cited

U.S. PATENT DOCUMENTS

| | | | |
|---|---|---|---|
| 5,861,662 A | 1/1999 | Candelore | |
| 6,745,331 B1* | 6/2004 | Silverbrook | 726/36 |
| 7,042,752 B2 | 5/2006 | Okuda | |
| 2002/0126792 A1 | 9/2002 | Fuhrmann et al. | |
| 2004/0236961 A1* | 11/2004 | Walmsley | 713/200 |
| 2007/0180541 A1* | 8/2007 | Shu et al. | 726/34 |
| 2008/0111716 A1* | 5/2008 | Artan et al. | 341/50 |
| 2009/0024758 A1* | 1/2009 | Levy-Abegnoli et al. | 709/237 |
| 2009/0126030 A1* | 5/2009 | Walmsley | 726/34 |
| 2009/0132624 A1* | 5/2009 | Haselsteiner et al. | 708/255 |
| 2009/0323955 A1* | 12/2009 | Ikushima et al. | 380/268 |
| 2010/0162352 A1* | 6/2010 | Haga et al. | 726/2 |

FOREIGN PATENT DOCUMENTS

| | | |
|---|---|---|
| JP | 10-294325 A | 11/1998 |
| JP | 2002-319010 A | 10/2002 |
| KR | 10 2005-0033780 A | 4/2005 |

* cited by examiner

Primary Examiner — Techane Gergiso
(74) Attorney, Agent, or Firm — Lee & Morse, P.C.

(57) ABSTRACT

A detection circuit, including a sensing circuit configured to sense whether there is an external attack and generate second data from first data, a data conversion circuit configured to convert the first data to third data, and a comparator configured to compare the second data with the third data.

12 Claims, 5 Drawing Sheets

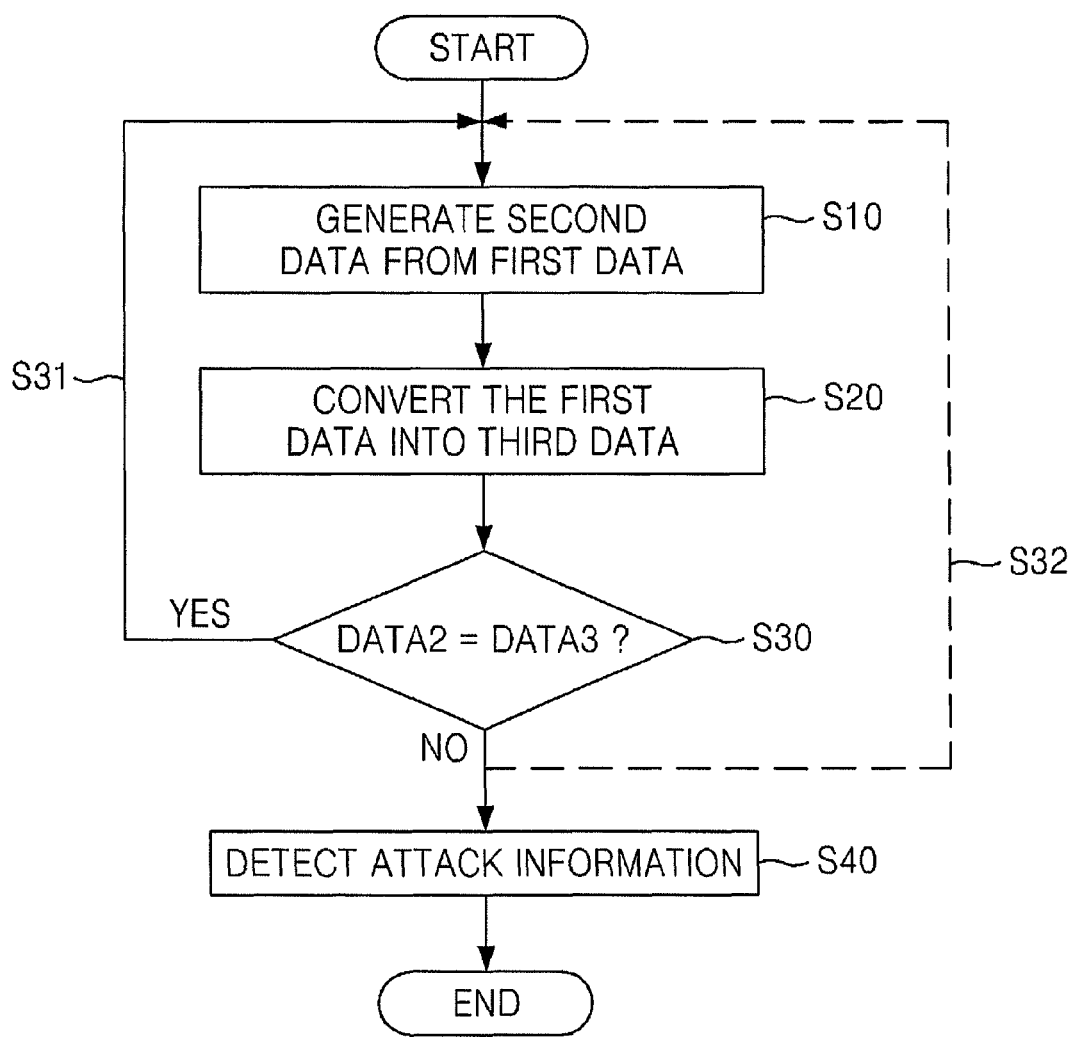

DETECTION CIRCUIT, DETECTION METHOD THEREOF, AND MEMORY SYSTEM INCLUDING THE DETECTION CIRCUIT

CROSS-REFERENCE TO RELATED APPLICATIONS

This application claims priority under 35 U.S.C. §119(a) from Korean Patent Application No. 10-2010-0109676 filed on Nov. 5, 2010, in the Korean Intellectual Property Office, the disclosure of which is hereby incorporated by reference in its entirety.

BACKGROUND

1. Field

Embodiments relate to a detection circuit, and more particularly, to a detection circuit and method for detecting an external attack and a system including the detection circuit.

2. Description of the Related Art

The detection circuit, e.g., an active shield removal detector, detects whether a shield, which shields an integrated circuit (IC) chip, especially a core chip, to protect data stored in the chip of a smart card particularly requiring security, has been removed by an attacker.

SUMMARY

One or more embodiments provide a detection circuit and method for detecting an external attack to protect a target circuit and a system including the detection circuit.

One or more embodiments provide a detection circuit, including a sensing circuit configured to sense whether there is an external attack and generate second data from first data, a data conversion circuit configured to convert the first data to third data, and a comparator configured to compare the second data with the third data.

When an external attack is not sensed, the second data generated by the sensing circuit may be the same as the third data, and, when an external attack is sensed, the second data generated by the sensing circuit may not be the same as the third data.

The first data has a different number of bits than the second data.

The detection circuit may include a random number generator configured to generate the first data.

The sensing circuit may include a plurality of random data generators connected in series to each other.

The plurality of random data generators may respectively generate random data that are different from each other.

The plurality of random data generators may be connected to each other through a plurality of metal lines.

The detection circuit may be implemented as a part of a smart card.

The sensing circuit may be configured to generate the second data from the first data via a sensing data path, and the data conversion circuit may be configured to convert the first data to third data using a first data path that is different from the sensing data path.

One or more embodiments provide a memory system, including a detection circuit that includes a sensing circuit configured to sense whether there is an external attack and generate second data from first data, a data conversion circuit configured to convert the first data to third data, and a comparator configured to compare the second data with the third data, and a memory controller configured to control an operation of a core chip according to attack detection information output from the comparator.

When an external attack is not sensed, the second data generated by the sensing circuit may be the same as the third data, and, when an external attack is sensed, the second data generated by the sensing circuit may not be the same as the third data.

The sensing circuit may include a plurality of random data generators connected in series to each other.

The plurality of random data generators may be connected to each other through a plurality of metal lines.

One or more embodiments provide a detection method for a detection circuit, the detection method including generating second data from first data using a sensing circuit, converting the first data into third data using a data conversion circuit, and comparing the second data with the third data to provide a detection result.

The third data may be the same as the second data when an external attack is not sensed by the sensing circuit and the third data may be different from the second data when an external attack is sensed by the sensing circuit.

The sensing circuit may include a plurality of random data generators connected in series to each other.

Generating the second data from the first data may include using a sensing data path coupled to the sensing circuit, and converting the first data into the third data may include using a first data path coupled to the data conversion circuit, the first data path being different from the sensing data path.

The first data path may bypass the sensing data path, and the sensing data path may include a plurality of metal lines, and generating the second data may be based on a condition of the metal lines.

One or more embodiments may provide a detection circuit, including a sensing circuit configured to sense an external attack and generate second data from first data using a sensing data path, a data conversion circuit configured to convert the first data to third data using a first data path, and a comparator configured to compare the second data with the third data and output an attack detection signal based on a result of the comparison.

The sensing data path may include a plurality of random data generators connected in series to each other via a plurality of metal lines, the first data path may be independent of the sensing data path, and the second data may be based on a condition of the metal lines.

BRIEF DESCRIPTION OF THE DRAWINGS

One or more features will become more apparent by describing in detail exemplary embodiments thereof with reference to the attached drawings in which:

FIG. 5 illustrates a flowchart of an exemplary operation of a memory system including the detection circuit illustrated in FIG. 1.

DETAILED DESCRIPTION OF THE EMBODIMENTS

Figure 1:
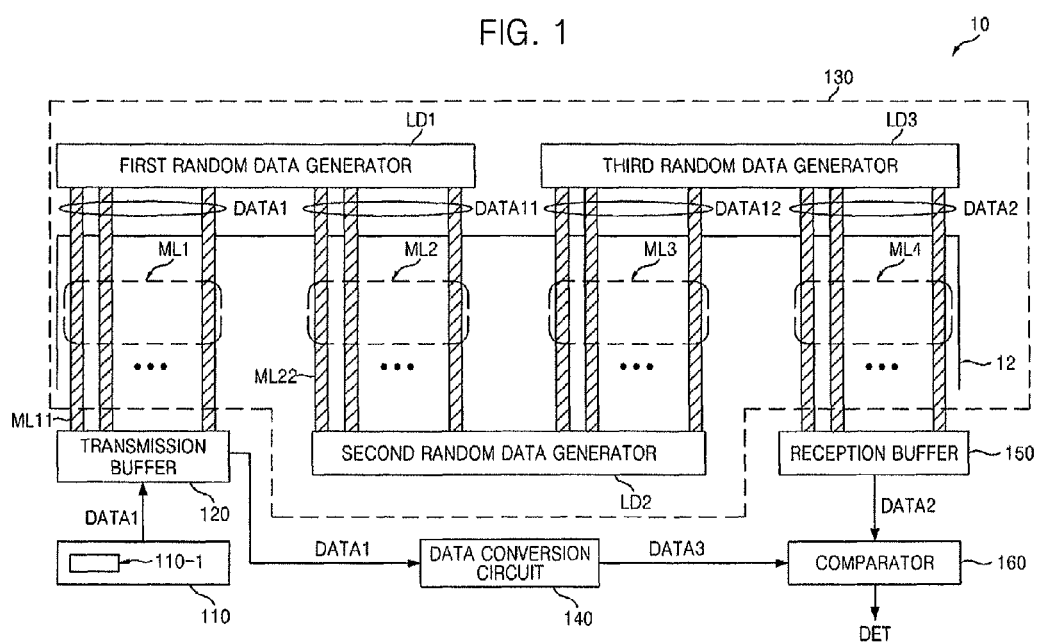
FIG. 1 illustrates a block diagram of an exemplary embodiment of a detection, including illustration of an exemplary metal line layout employable therewith.

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates a block diagram of an exemplary embodiment of a detection circuit 10, including illustration of an exemplary metal line layout employable therewith.

Referring to FIG. 1, the detection circuit 10 may include an input data generator 110, a sensing circuit 130, a data conversion circuit 140, and a comparator 160. The detection circuit 10 may also include a transmission buffer 120 and a reception buffer 150. The input data generator 110 may generate first data DATA1 including a plurality of digital bits using a random number generator 110-1. The random number generator 110-1 may generate a random number using a function having an external condition as a variable or a function conforming to a certain rule. The random number generator 110-1 may be used to perform an encryption algorithm in systems requiring security, e.g., smart cards, IC cards, and mobile communications systems.

More particularly, e.g., the random number generator 110-1 may generate a random number, e.g., the first data DATA1, to prevent data transmitted to the sensing circuit 130 from being easily exposed to an attack by an attacker or a hacker. The first data DATA1 may be N (N is a natural number, e.g., 16 or 32)-bit data.

The transmission buffer 120 may buffer the first data DATA1 output from the input data generator 110 and transmit the buffered first data DATA1 to the sensing circuit 130. The sensing circuit 130 may include a plurality of random data generators LD1, LD2, and LD3, and a plurality of metal line groups ML1, ML2, ML3, and ML4.

In the exemplary embodiment of FIG. 1, the three random data generators LD1, LD2, and LD3 and the four metal line groups ML1, ML2, ML3, and ML4 are shown. However, embodiments are not limited thereto, e.g., may include more or less of each of random data generators and/or metal line groups.

More particularly, referring to FIG. 1, the first data DATA1 output from the transmission buffer 120 is transmitted to the first random data generator LD1 through the first metal line group ML1.

The first random data generator LD1 generates first random data DATA11 different from the first data DATA1 and transmits the first random data DATA11 to the second random data generator LD2 through the second metal line group ML2. The second random data generator LD2 generates second random data DATA12 that is different from the first random data DATA11 and transmits the second random data DATA12 to the third random data generator LD3 through the third metal line group ML3.

The third random data generator LD3 generates third random data as second data DATA2 that is different from the second random data DATA12, and transmits the second data DATA2 to the reception buffer 150 through the fourth metal line group ML4.

The transmission buffer 120, the random data generators LD1, LD2, and LD3, and the reception buffer 150 may be connected in series to one another through the metal line groups ML1, ML2, ML3, and ML4. Metal lines ML11, ML22, ML33, ML44 in one, some or all of the metal line groups ML1, ML2, ML3, ML4, respectively, may be arranged parallel to each other and/or may be spaced a predetermined distance from each other.

In one or more embodiments, the metal line groups ML1, ML2, ML3, and ML4 may be formed to enclose the core chip 12 so as to protect the core chip 12 from an external attack. The reception buffer 150 may buffer the second data DATA2 output from the fourth metal line group ML4 and may transmit the buffered second data DATA2 to the comparator 160.

The data conversion circuit 140 may receive the first data DATA1 through a data path and may convert the first data DATA1 into third data DATA3. More particularly, e.g., the data conversion circuit 140 may receive the first data DATA1 through a data path that does not pass through the sensing circuit 130, i.e., the data conversion circuit 140 may receive the first data DATA1 through a data path that bypasses the sensing circuit 130. The third data DATA3 may be the same as the second data DATA2 output through the sensing circuit 130 and the reception buffer 150 when there are no external attacks.

The comparator 160 bitwise compares the second data DATA2 received through the reception buffer 150 with the third data DATA3 received through the data conversion circuit 140 and outputs attack detection information DET according to a comparison result. More particularly, e.g., when an attack or damage has occurred, e.g., at least one metal line in the metal line groups ML1, ML2, ML3, and ML4 is removed or when two corresponding metal lines, e.g., one of the metal lines ML11 in the first metal line group ML1 and one of the metal lines ML22 in the second metal line group ML2, are connected through a bypass, the second data DATA2 is different from the third data DATA3. Accordingly, the comparator 160 may output the attack detection information DET at a second level, e.g., a high level or logic "1".

In one or more embodiments, e.g., when any one of the metal lines in any one of the metal line groups ML1, ML2, ML3, and ML4 is attacked, damaged, and/or removed, the comparator 160 may output the attack detection information DET having the second level.

Figure 2:
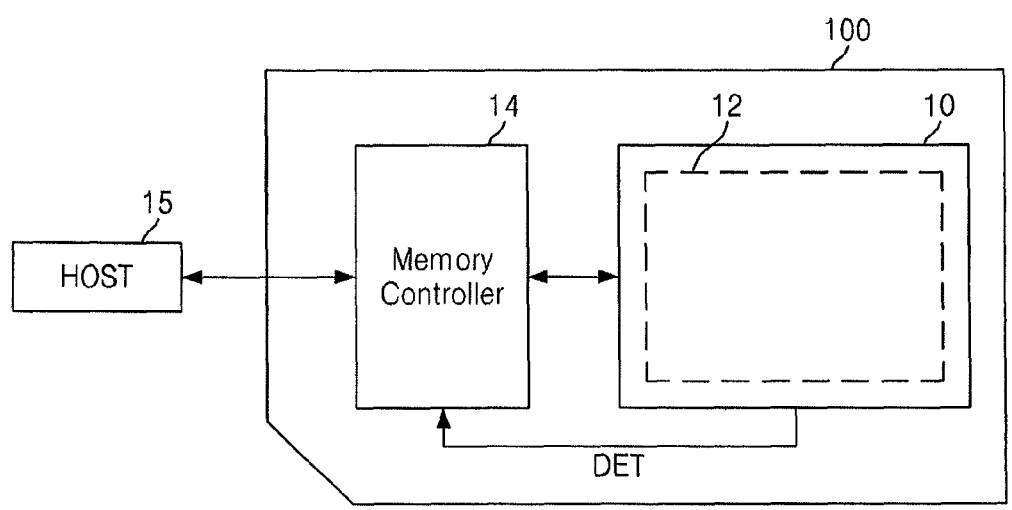
FIG. 2 illustrates a block diagram of an exemplary embodiment of a memory system including the detection circuit of FIG. 1.

FIG. 2 illustrates a block diagram of an exemplary embodiment of a memory system 100 including the detection circuit 10 of FIG. 1. Referring to FIG. 2, the memory system 100 may include the detection circuit 10, a core chip 12, and a memory controller 14. The detection circuit 10 may be laid out so as to enclose the core chip 12. The layout of the detection circuit 10 enclosing the core chip may be changed in various ways. The core chip 12 may include a memory (not shown) that stores data and a peripheral circuit (not shown) that performs an access operation, e.g., a write operation or a read operation, on the memory.

For clarity of the description, in FIG. 2, a host 15 employable with the memory system 100 is also illustrated. More particularly, the memory system 100 may be a system including a detection circuit, e.g., 10, for detecting an external attack and may be implemented as a smart card. Embodiments are not, however, limited thereto.

Referring to FIGS. 1 and 2, in one or more embodiments in which the detection device 10 of FIG. 1 is employed within the system 100, the core chip 12 may be enabled or disabled according to the logic state of the attack detection information DET output by the detection circuit 10.

For instance, when an attack or damage has occurred, e.g., at least one metal line in the metal line groups ML1, ML2, ML3, and ML4 is removed or when two corresponding metal lines, e.g., one of the metal lines ML11 in the first metal line group ML1 and one of the metal lines ML22 in the second metal line group ML2, are connected through a bypass, the second data DATA2 is different from the third data DATA3. Accordingly, the comparator 160 may output the attack detection information DET at a second level, e.g., a high level or logic "1".

In one or more embodiments, e.g., when any one of the metal lines in any one of the metal line groups ML1, ML2, ML3, and ML4 is attacked, damaged, and/or removed, the comparator 160 may output the attack detection information DET having the second level.

Accordingly, the core chip 12 may be disabled in response to the attack detection information DET having the second level. Further, e.g., the core chip 12 may be enabled or disabled according to the logic state of the attack detection information DET.

Further, in one or more embodiments, when the attack detection information DET at the second level is input to a controller, e.g., memory controller 14 of FIG. 2, that can control the operation of the core chip 12, the memory controller 14 may disable the operation of the core chip 12 in response to the attack detection information DET having the second level.

When the metal line groups ML1, ML2, ML3, and ML4 have not been attacked, the comparator 160 may output the attack detection information DET having a first level, e.g., a low level or logic "0", according to a result of comparing the second data DATA2 with the third data DATA3. Accordingly, the core chip 12 may continue the normal operation in response to the attack detection information DET having the first level.

Alternatively, when the attack detection information DET having the first level is input to a controller, e.g., the memory controller 14, that can control the operation of the core chip 12, the memory controller 14 may control the core chip 12 to perform the normal operation in response to the attack detection information DET having the first level.

The memory controller 14 may communicate with the host 15. The core chip 12 may be implemented by a non-volatile memory device, e.g., flash electrically erasable programmable read-only memory (EEPROM) or a resistive memory.

Figure 3:
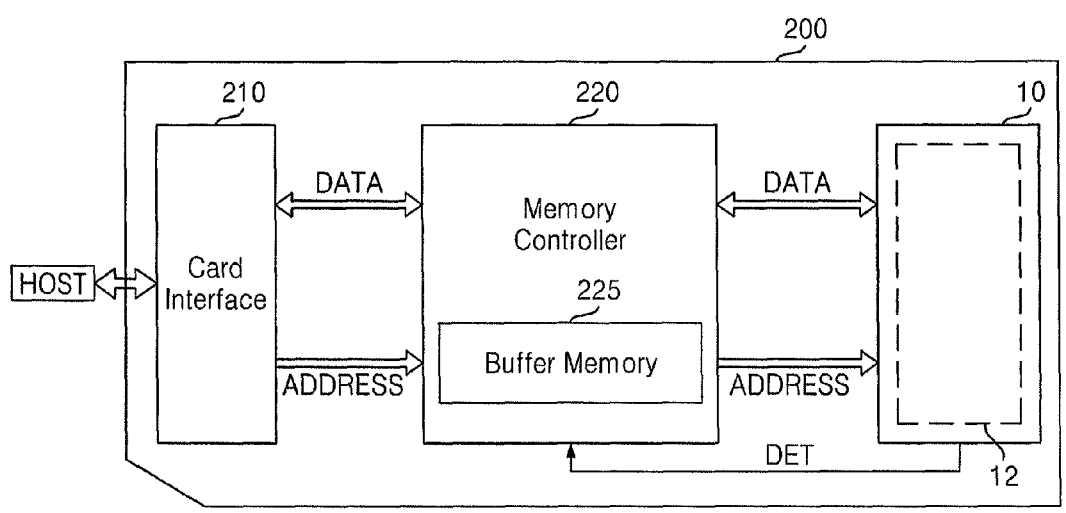
FIG. 3 illustrates a block diagram of another exemplary embodiment of a memory system including the detection circuit of FIG. 1.

FIG. 3 illustrates a block diagram of another exemplary embodiment of a memory system 200 including the detection circuit 10 of FIG. 1. Referring to FIG. 3, the memory system 200 may include a card interface 210, a memory controller 220, the detection circuit 10, and the core chip 12. In general, only differences between the system 100 of FIG. 2 and the system 200 of FIG. 3 will be described below.

The memory system 200 may exchange data with a host through the card interface 210. The card interface 210 may be, e.g., a secure digital (SD) card interface or a multi-media card (MMC) interface, but embodiments are not restricted thereto.

The card interface 210 may interface data between the memory controller 220 and the host that is configured to communicate with the memory system 200. The memory controller 220 may control the overall operation of the memory system 200 and control data exchange between the card interface 210 and the core chip 12. A buffer memory 225 included in the memory controller 220 may buffer data transferred between the card interface 210 and the core chip 12.

The memory controller 220 is connected with the memory controller 220 and the core chip 12 through a data bus DATA and an address bus ADDRESS. The memory controller 220 may receive an address of data to be read or written from the card interface 210 through the address bus ADDRESS and may transmit the address to the core chip 12. In addition, the memory controller 220 may receive or transmit data to be read or written through the data bus DATA connected to the card interface 210 and the core chip 12.

When an external attack is sensed, the detection circuit 10 may output the attack detection information DET at the second level to the memory controller 220, and the memory controller 220 may disable the core chip 12 in response to the attack detection information DET at the second level. In other words, the detection circuit 10 may protect the core chip 12 from an external attack, e.g., a physical attack.

The core chip 12 may store various types of data. A read or write operation may be performed on the core chip 12. At this time, a memory cell array on which the read operation is performed may be different from a memory cell array on which the write operation is performed in the core chip 12.

When the memory system 200 illustrated in FIG. 3 is connected to the host, e.g., a personal computer (PC), a tablet PC, a digital camera, a digital audio player, a cellular phone, a console video game hardware, a set-top box, etc., the host may perform data communication with the core chip 12 through the card interface 210 and the memory controller 220.

Figure 4:
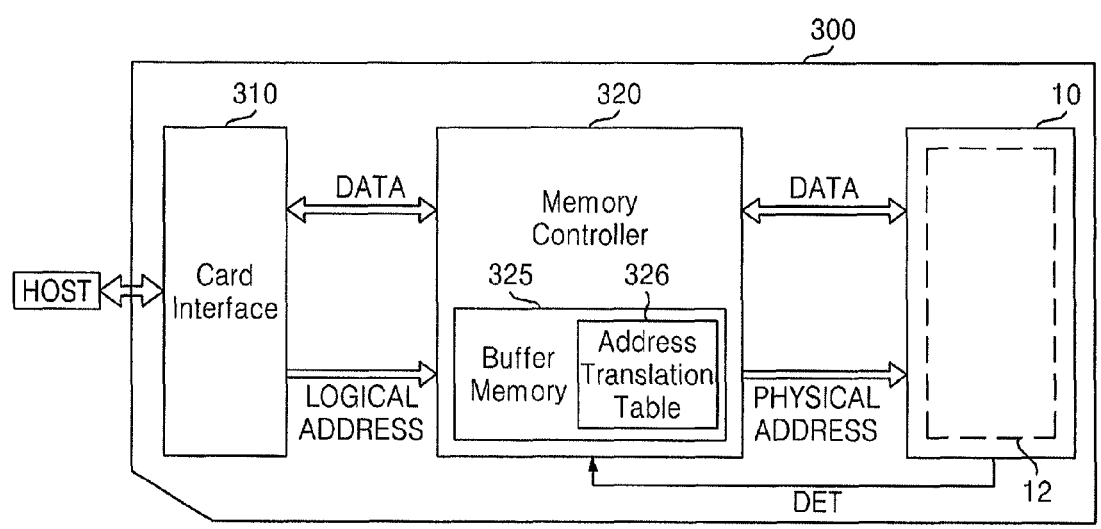
FIG. 4 illustrates a block diagram of another exemplary embodiment of a memory system including the detection circuit shown in FIG. 1.

FIG. 4 illustrates a block diagram of another exemplary embodiment of a memory system 300 including the detection circuit 10 shown in FIG. 1. Referring to FIG. 4, the memory system 300 may include a card interface 310, a memory controller 320, the detection circuit 10, and the core chip 12. In general, only differences between the system 100 of FIG. 2 and the system 300 of FIG. 4 will be described below.

The memory system 300 may exchange data with a host through the card interface 310. The card interface 310 may be, e.g., a secure digital (SD) card interface or a multi-media card (MMC) interface, but embodiments are not restricted thereto.

The card interface 310 may interface data between the memory controller 320 and the host that is configured to communicate with the memory system 300. The memory controller 320 may control the overall operation of the memory system 300 and control data exchange between the card interface 310 and the core chip 12. A buffer memory 325 included in the memory controller 320 may buffer various types of data for controlling the overall operation of the memory system 300.

The memory controller 320 is connected with the memory controller 320 and the core chip 12 through a data bus DATA and an address bus ADDRESS.

The memory controller 320 may receive an address of data to be read or written from the card interface 310 through a logical address bus LOGICAL ADDRESS and transmit the address to the core chip 12 through a physical address bus PHYSICAL ADDRESS. In addition, the memory controller 320 may receive or transmit data to be read or written through the data bus DATA connected to the card interface 310 and the core chip 12.

The memory controller 320 of the memory system 300 may include an address translation table 326 within the buffer memory 325. The address translation table 326 may store information for translating an external logical address into a physical address for accessing the core chip 12. The address translation table 326 may be updated.

The memory controller 320 may select a physical address for the read operation while performing the write operation with reference to a physical address for the write operation in the address translation table 326. The memory controller 320 may carry out the write operation and the read operation side by side and may update the address translation table 326 according to the write and read operations. As a result, the operating time of the memory system 300 may be reduced.

The detection circuit 10 may sense whether there is an external attack and transmit the attack detection information DET at the second level to the memory controller 320 according to a sensing result. The memory controller 320 may disable the operation of the core chip 12 in response to the attack detection information DET at the second level. As a result, the detection circuit 10 may protect the core chip 12 from a physical attack from outside.

The core chip 12 may store various types of data. A read or write operation may be performed on the core chip 12. In one or more embodiments, a memory cell array on which a read operation is performed may be different from a memory cell array on which a write operation is performed in the core chip 12.

When the memory system 300 illustrated in FIG. 4 is connected to the host, e.g., a PC, a tablet PC, a digital camera, a digital audio player, a cellular phone, a console video game hardware, a set-top box, etc., the host may perform data communication with the core chip 12 through the card interface 310 and the memory controller 320.

FIG. 5 illustrates a flowchart of an exemplary embodiment of a method of operating a memory system, e.g., 100, 200, 300, including the detection circuit 10 illustrated in FIG. 1.

Referring to FIGS. 1 through 5, the sensing circuit 130 may sense whether there is an external attack and may generate the second data DATA2 different from the first data DATA1 according to a sensing result (S10).

The data conversion circuit 140 may convert the first data DATA1 to generate the third data DATA3 different from the first data DATA1 (S20). The comparator 160 may compare the second data DATA2 output through the sensing circuit 130 and the reception buffer 150 with the third data DATA3 output from the data conversion circuit 140 (S30). When there are no external attacks, the second data DATA2 is the same as the third data DATA3. When there are not external attacks sensed, the comparator 160 may generate the attack detection information DET at the first level (S40) and the sensing circuit 130 may continue sensing for the presence (or absence) of an external attack (S31).

In one or more embodiments, when there is an external attack, the second data DATA2 is not the same as the third data DATA3. When an external attack is sensed by the sensing circuit 130, the comparator 160 generates the attack detection information DET at the second level in operation S40 and the sensing circuit 130 continues sensing for the presence of an external attack in operation S32. In one or more embodiments, regardless of whether there is an external attack, the sensing circuit 130 may continue sensing for the presence of an external attack on the core chip 12.

As described above, in one or more embodiments, even when an attacker connects two metal lines through a bypass, data of one of the metal lines can be controlled to be different from data of the other metal line, so that the attacker's attack can be effectively prevented.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A detection circuit, comprising:
a sensing circuit configured to sense whether there is an external attack and generate second data from first data, the sensing circuit including a plurality of random data generators connected through a plurality of sets of metal lines for sensing the external attack;
a data conversion circuit configured to convert the first data to third data; and
a comparator configured to compare the second data with the third data, wherein:
a first of the plurality of random data generators is configured to receive the first data and to generate a first random data different from the first data,
a last of the plurality of random data generators is configured to receive a last random data different from the first data and to generate the second data, and
a second of the plurality of random data generators is configured to receive the first random data and to generate the last random data, the first random data being different from the last random data.

2. The detection circuit as claimed in claim 1, wherein, when the external attack is not sensed, the second data generated by the sensing circuit is the same as the third data, and, when the external attack is sensed, the second data generated by the sensing circuit is not the same as the third data.

3. The detection circuit as claimed in claim 1, wherein the first data has a different number of bits than the second data.

4. The detection circuit as claimed in claim 1, wherein the plurality of random data generators are connected in series to each other.

5. The detection circuit as claimed in claim 4, wherein the plurality of random data generators respectively generate random data that are different from each other.

6. The detection circuit as claimed in claim 1, wherein the detection circuit is implemented as a part of a smart card.

7. The detection circuit as claimed in claim 1, wherein the sensing circuit is configured to generate the second data from the first data via a sensing data path, and the data conversion circuit is configured to convert the first data to third data using a first data path that is different from the sensing data path.

8. The detection circuit as claimed in claim 1, wherein:
the plurality of random data generators are connected through a plurality of sets of metal lines, each of the sets of metal lines including a plurality of individual metal lines, and each of the sets of metal lines being parallel to each other, and
the sets of metal lines include a first set of metal lines through which the first data is sent to the first of the plurality of random data generators, a second set of metal lines through which the first random data is sent to the second of the plurality of random data generators, and a third set of metal lines through which the last random data is sent to the last of the plurality of random data generators, and a fourth set of metal lines through which the second data is sent to the comparator.

9. The detection circuit as claimed in claim 1, wherein:
the data conversion circuit by-passes the sensing circuit, and
the comparator is configured to compare the second data with the third data to generate a comparison result, and is configured to generate an output signal to enable or disable a core chip of a memory system based on the comparison result.

10. A memory system, comprising:
the detection circuit as claimed in claim 1; and
a memory controller configured to control an operation of a core chip according to attack detection information output from the comparator.

11. The memory system as claimed in claim 10, wherein, when the external attack is not sensed, the second data generated by the sensing circuit is the same as the third data, and, when the external attack is sensed, the second data generated by the sensing circuit is not the same as the third data.

12. The memory system as claimed in claim 11, wherein the plurality of random data generators are connected in series to each other.

* * * * *